(12) United States Patent
Bolin

(10) Patent No.: US 8,288,882 B2
(45) Date of Patent: *Oct. 16, 2012

(54) FIN-RING PROPELLER FOR A WATER CURRENT POWER GENERATION SYSTEM

(75) Inventor: William D. Bolin, Spring, TX (US)

(73) Assignee: Anadarko Petroleum Corporation, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,451

(22) Filed: May 17, 2011

(65) Prior Publication Data

US 2011/0217174 A1     Sep. 8, 2011

Related U.S. Application Data

(60) Continuation of application No. 12/788,099, filed on May 26, 2010, now abandoned, and a division of application No. 12/702,546, filed on Feb. 9, 2010.

(60) Provisional application No. 61/259,359, filed on Nov. 9, 2009.

(51) Int. Cl.
    *F03B 13/00*    (2006.01)
    *H02P 9/04*    (2006.01)
    *F03D 9/00*    (2006.01)

(52) U.S. Cl. ................. 290/54; 290/43; 290/53; 290/55

(58) Field of Classification Search ................ 290/43, 290/53, 54, 55
    See application file for complete search history.

(56) References Cited

U.S. PATENT DOCUMENTS 1,350,187 A    8/1920  Streibich et al. ................ 415/77
(Continued)

FOREIGN PATENT DOCUMENTS

DE            2909781 A1    9/1980
(Continued)

OTHER PUBLICATIONS

European Search Report issued Sep. 21, 2011 in corresponding EP application No. 10169624.3-1267/2320069.
Notification of Transmittal of the International Search Report and the Written Opinion of the International Searching Authority, or the Declaration issued by the International Searching Authority on Sep. 21, 2011 in the corresponding international application No. PCT/US2010/023598.

*Primary Examiner* — Pedro J Cuevas
(74) *Attorney, Agent, or Firm* — Raymond R. Ferrera; Adams and Reese LLP

(57) ABSTRACT

A water current power generation system is provided, including a plurality of flotation tubes joined by a body structure; a plurality of ballast chambers joined by a body structure; a plurality of induction type power generation units disposed within housings associated with one or more of the flotation chambers, ballast chambers and body structure; and a plurality of propellers disposed in mechanical communication with each of the induction type generator units. In one presently preferred embodiment, a plurality of propellers disposed in communication with a plurality of induction type generator units, wherein the propellers each include one or more concentrically disposed rings, with each of the concentrically disposed rings having an inner ring member, an outer ring member, and a plurality of curved fin members separated by gap spaces disposed between the inner and outer ring members. Methods and means of deploying, positioning, maintaining, controlling and operating the system are also provided, as are detailed descriptions of novel inductor type generators used to obtain power from fast moving water currents, flotation tanks for tensioning the system against a submerged anchoring system disposed on an associated seafloor, and fluid-filled ballast chambers equipped with multiple sub-chambers that lend precision control and continuous adjustability to the system.

12 Claims, 7 Drawing Sheets

U.S. PATENT DOCUMENTS

| | | | |
|---|---|---|---|
| 1,441,788 A | 1/1923 | De Coninck Marcel | 416/193 R |
| 1,739,866 A | 12/1929 | Schuh | 416/144 |
| 2,501,696 A | 3/1950 | Souczek | 290/43 |
| 3,222,533 A | 12/1965 | Mackay | 290/55 |
| 3,848,464 A | 11/1974 | Scheipner et al. | 73/170.29 |
| 3,986,787 A | 10/1976 | Mouton, Jr. et al. | 415/7 |
| 4,289,450 A | 9/1981 | Kling | 416/192 |
| 4,330,714 A | 5/1982 | Smith | 290/55 |
| 4,383,182 A | 5/1983 | Bowley | 290/43 |
| 4,613,279 A | 9/1986 | Corren et al. | 415/121.2 |
| 4,720,640 A | 1/1988 | Anderson et al. | 290/43 |
| 4,850,190 A | 7/1989 | Pitts | 60/398 |
| 4,863,350 A | 9/1989 | Quarterman | 416/193 R |
| 4,864,152 A | 9/1989 | Pedersen | 290/53 |
| 5,096,382 A | 3/1992 | Gratzer | 416/189 |
| 5,292,088 A | 3/1994 | Lemont | 244/65 |
| 5,599,172 A | 2/1997 | McCabe | 417/334 |
| 5,910,688 A | 6/1999 | Li | 290/55 |
| 6,091,161 A | 7/2000 | Dehlsen et al. | 290/43 |
| 6,531,788 B2 | 3/2003 | Robson | 290/43 |
| 6,692,319 B2 | 2/2004 | Collier et al. | 440/66 |
| 6,841,892 B1 | 1/2005 | Le Nabour et al. | 290/43 |
| 6,849,965 B2 | 2/2005 | Le Nabour et al. | 290/55 |
| 6,887,031 B1 | 5/2005 | Tocher | 415/1 |
| 7,105,942 B2 | 9/2006 | Henriksen | 290/55 |
| 7,220,096 B2 | 5/2007 | Tocher | 415/1 |
| 7,291,936 B1 | 11/2007 | Robson | 290/43 |
| 7,307,356 B2 | 12/2007 | Fraenkel | 290/54 |
| 7,323,792 B2 | 1/2008 | Sohn | 290/55 |
| 7,331,762 B2 | 2/2008 | Fraenkel | 416/85 |
| 7,352,074 B1 | 4/2008 | Pas | 290/43 |
| 7,438,504 B2 | 10/2008 | Henriksen | 405/223.1 |
| 7,489,046 B2 | 2/2009 | Costin | 290/43 |
| 7,530,224 B2 | 5/2009 | Fraenkel | 60/398 |
| 7,541,688 B2 | 6/2009 | Mackie | 290/54 |
| 7,550,864 B2 | 6/2009 | Anderson et al. | 290/55 |
| 7,682,126 B2 | 3/2010 | Parker | 415/3.1 |
| 7,728,446 B2 | 6/2010 | Hofbauer et al. | 290/1 A |
| 7,737,570 B2 | 6/2010 | Costin | 290/43 |
| 2002/0158472 A1 | 10/2002 | Robson | 290/43 |
| 2005/0029817 A1 | 2/2005 | Gizara | 290/43 |
| 2006/0138777 A1 | 6/2006 | Hofbauer et al. | 290/1 R |
| 2007/0241566 A1 | 10/2007 | Kuehnle | 290/53 |
| 2007/0257492 A1 | 11/2007 | Robson | 290/54 |
| 2008/0012345 A1 | 1/2008 | Parker | 290/54 |
| 2008/0194155 A1 | 8/2008 | Gaudin | 440/67 |
| 2008/0258465 A1 | 10/2008 | Johnston | 290/53 |
| 2008/0273962 A1 | 11/2008 | Andersen et al. | 415/62 |
| 2008/0315585 A1 | 12/2008 | Marvin | 290/44 |
| 2009/0008939 A1 | 1/2009 | Pare et al. | 290/44 |
| 2009/0096217 A1 | 4/2009 | Watson | 290/55 |
| 2009/0167026 A1 | 7/2009 | Marvin | 290/55 |
| 2009/0230686 A1 | 9/2009 | Catlin | 290/54 |
| 2010/0164230 A1 | 7/2010 | Belinsky et al. | 290/54 |

FOREIGN PATENT DOCUMENTS

| | | |
|---|---|---|
| GB | 2434410 A | 7/2007 |
| RU | 95101119 A1 | 1/1997 |
| WO | 2009026620 A1 | 3/2009 |
| WO | 2009098057 A1 | 8/2009 |

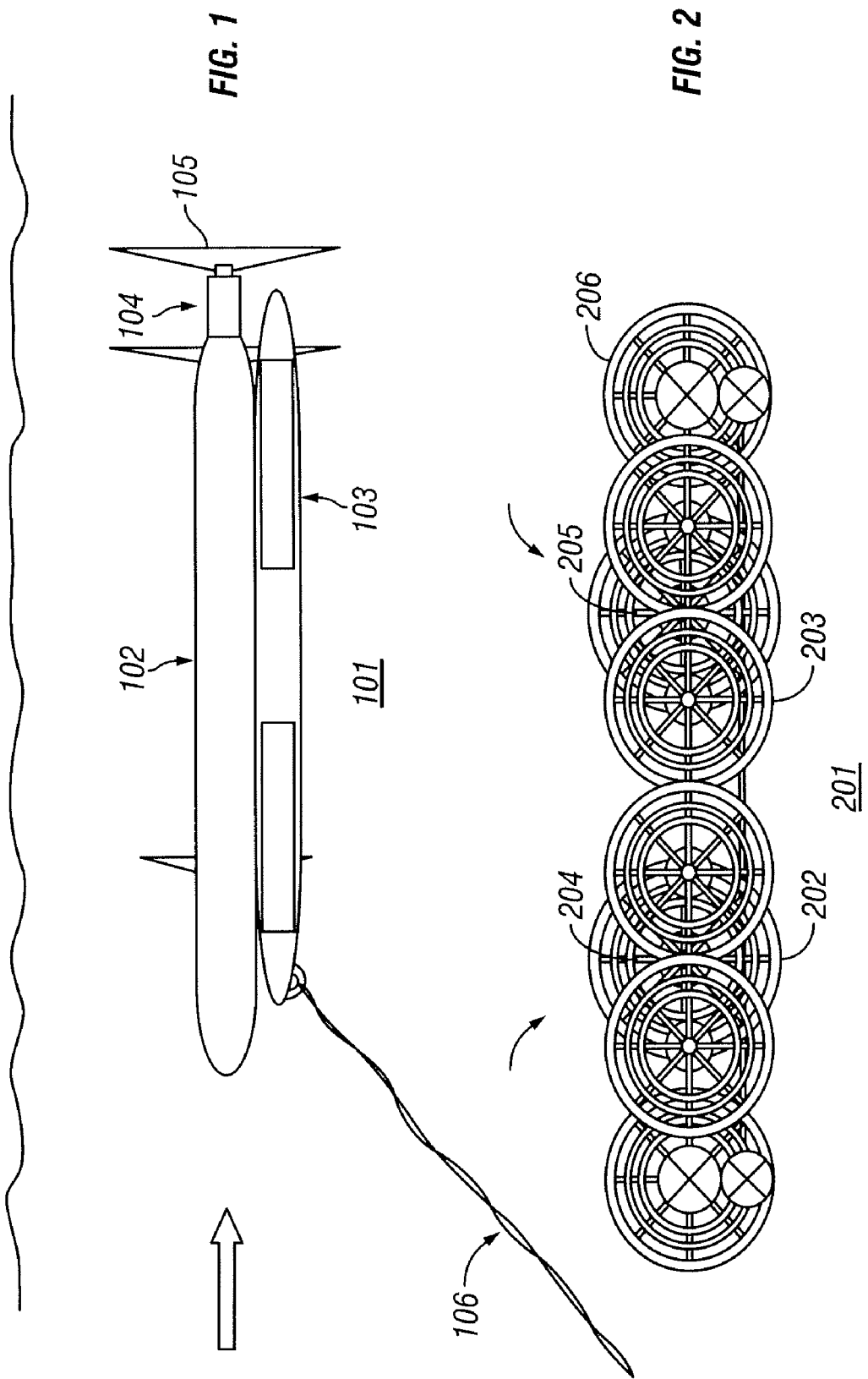

FIN-RING PROPELLER FOR A WATER CURRENT POWER GENERATION SYSTEM

STATEMENT OF RELATED CASES

The instant application is a continuation of U.S. Non-Provisional application Ser. No. 12/788,099 filed May 26, 2010, still pending, which is a divisional of U.S. Non-Provisional application Ser. No. 12/702,546 filed Feb. 9, 2010, still pending, which claims the benefit of prior U.S. Provisional Application No. 61/259,359 filed Nov. 9, 2009.

FIELD OF THE INVENTION

The present invention relates generally to renewable energy power generation systems, and in a particular though non-limiting embodiment, to a submerged or waterborne system for generating power derived from fast-moving water currents using an induction-type generator system equipped with one or more fin-ring propellers. The fin-ring propellers shown and described herein are also suitable for use in systems using conventional generator drive systems and other means of power creation.

BACKGROUND OF THE INVENTION

With the rising cost of fossil fuels and increased energy demand in the world's economies and industries, different and more efficient methods of developing energy sources are constantly being sought. Of particular interest are renewable alternative energy sources, such as solar power devices with batteries, windmill farms, and systems deriving power from sequestered hydrogen.

However, such energy sources are not yet capable of delivering continuous power to a widespread area on a commercial scale. Moreover, some proposed technologies, such as hydrogen powered systems involving the refinement of seawater, actually consume more power in the conversion process than is output at the end of the system. Others, such as hydrogen derived from methane, produce equal or greater amounts of fossil fuel emissions than the conventional oil-based technologies they are intended to replace, and still others, such as battery, solar and windmill based systems, require such consistent exposure to significant sunlight or winds that their commercial effectiveness is inherently limited.

One proposed alternative energy system involves the harnessing of hydro power derived from fast moving water currents, for example, currents having peak flow velocities of 2 m/s or more.

In practice, however, existing underwater power generating devices have proven inadequate, even where installed at sites where current velocities are consistently very fast. This is due, at least in part, to both a lack of efficient means for generating the power and for compatibly transferring power obtained from underwater power generating systems to an attendant land or waterborne power relay station.

Existing propeller designs and waterborne power generating mechanisms have also proven to be inadequate, failing to provide either adequate energy generation or sufficient stability against maximum velocity currents.

Another significant problem is the environmental issues associated with obtaining energy from water currents without damaging surrounding aquatic life, such as reefs, marine foliage, schools of fish, etc.

There is, therefore, an important and as yet unmet need for a water current power generation system that overcomes the problems currently existing in the art, and which generates and transfers to a relay station a significant amount of power in a safe, reliable, and environmentally-friendly manner.

SUMMARY OF THE INVENTION

A water current power generation system having a fin-ring propeller system is provided, the system including: a flotation chamber; an induction type power generation unit disposed within a housing associated with the flotation chamber; and a propeller disposed in communication with the induction type generator unit, wherein the propeller further comprises one or more concentrically disposed rings, each of the concentrically disposed rings having an inner ring member, an outer ring member, and a plurality of curved fin members separated by gap spaces disposed between the inner and outer ring members.

A further water current power generation system having a fin-ring propeller system is also provided, the system including: a plurality of flotation tubes joined by a body structure; a plurality of ballast chambers joined by a body structure; a plurality of induction type power generation units disposed within housings associated with one or more of the flotation chambers, ballast chambers and body structure; and a plurality of propellers disposed in communication with the induction type generator units, wherein the plurality of propellers further comprise one or more concentrically disposed rings, the concentrically disposed rings having an inner ring member, an outer ring member, and a plurality of curved fin members separated by gap spaces disposed between the inner and outer ring members.

A propeller system for submerged or waterborne structures is also provided, the propeller system including: a hub member for disposing said propeller in communication with a drive system; and one or more concentrically disposed rings, the concentrically disposed rings having an inner ring member, an outer ring member, and a plurality of curved fin members separated by gap spaces disposed between the inner ring member and said outer ring member.

BRIEF DESCRIPTION OF THE DRAWINGS

The embodiments disclosed herein will be better understood, and numerous objects, features, and advantages made apparent to those skilled in the art by referencing the accompanying drawings.

FIG. 1 is a side view of a water current power energy generation system according to one example embodiment of the invention.

FIG. 2 is a front view of a water current power energy generation system according to a second example embodiment of the invention.

DETAILED DESCRIPTION OF SEVERAL EXAMPLE EMBODIMENTS

Figure 3:
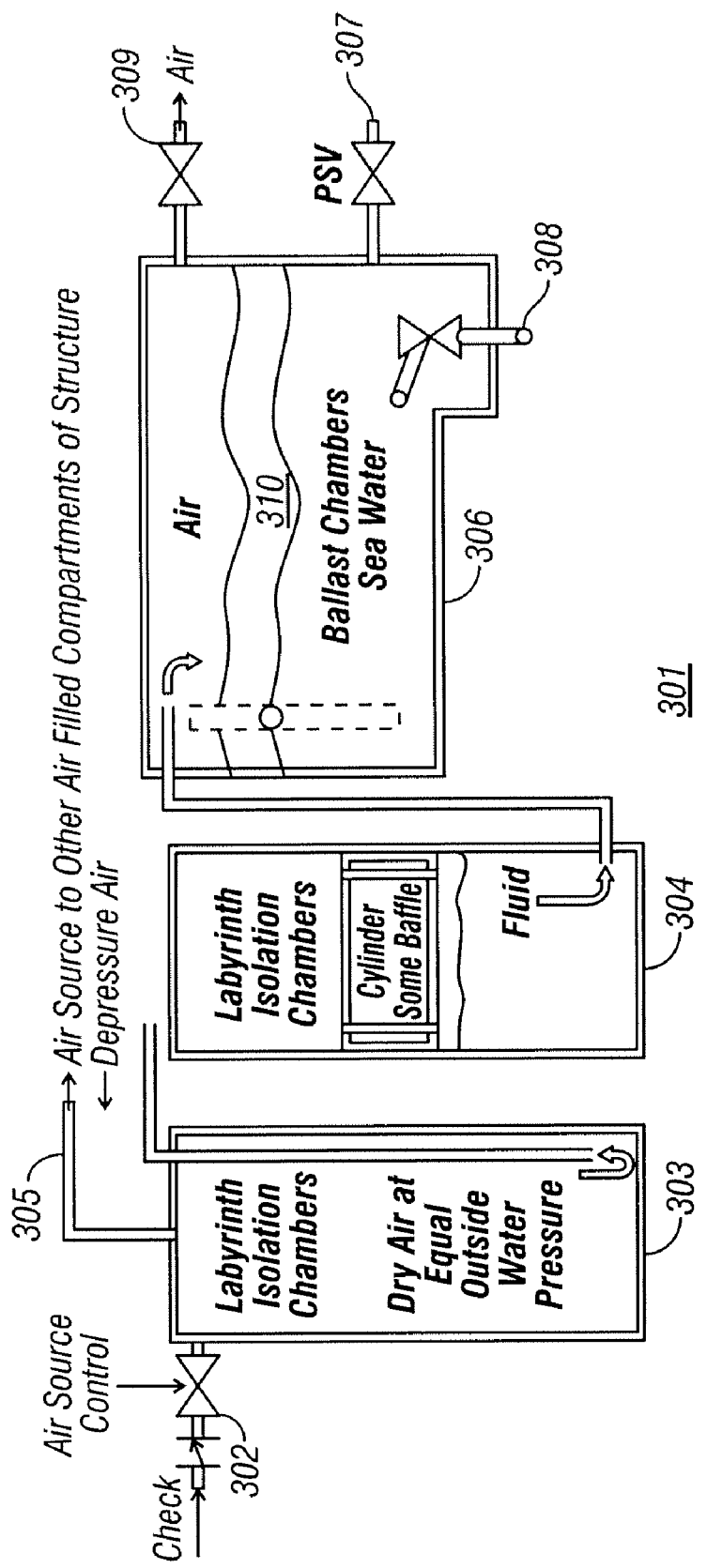
FIG. 3 is a plan view of a ballast tube having a plurality of labyrinth type isolation chambers according to a third embodiment of the invention.

The description that follows includes a number of exemplary system designs and methods of use that embody advantages of the presently inventive subject matter. However, it will be understood by those of ordinary skill in the art that the disclosed embodiments will admit to practice without some of the specific details recited herein. In other instances, well-known sub-sea and power generating equipment, protocols, structures and techniques have not been described or shown in detail in order to avoid obfuscation of the invention.

FIG. 1 depicts a first example embodiment of a water current power generation system 101. In its simplest form, the system comprises a flotation tube 102, a ballast tube 103, and an induction type power generation unit 104 equipped with a propeller 105.

While FIG. 1 appears to depict only a single flotation tube 102, ballast unit 103 and generator component 104, it is in fact a side view of a larger system, and commercial embodiments comprising multiple tubes and generator components are presently contemplated and described below. Nonetheless, those of skill in the pertinent arts will readily appreciate that description of a limited system with singular elements is illustrative, and will not limit the scope of the subject matter disclosed herein.

The novelty of the system lies in the induction type power generation unit 104, which lends simplicity and reliability to operations, and produces power that can be output either with or without transformation as an alternating current (AC) to an associated relay station (not shown). The system is therefore capable of producing AC power on a commercially viable scale that can be easily sold to and used by a neighboring electrical grid.

Generally, induction generators are mechanically and electrically simpler than other types of synchronous electrical power generators or direct current (DC) generators. They also tend to be more rugged and durable, and usually require neither brushes nor commutators.

For example, an electrical three-phase asynchronous (e.g., cage wound) induction machine will, when operated slower than its synchronous speed, function as a motor; the same device, however, when operated faster than its synchronous speed, will function as an induction generator.

In short, induction generators can be used to produce alternating electrical power when an internal shaft is rotated faster than the synchronous frequency. In the present invention, the shaft rotation is accomplished by means of an associated propeller 105 disposed in a relatively fast moving water current.

Power derived from the system will, in most cases, be intended to supplement a neighboring power grid system, and thus the operating frequencies of the grid will dictate the frequency of operation for the power generation system. For example, many large power grid systems currently employ a nominal operating frequency of between 50 and 60 Hertz.

Induction generators are not self-exciting, however, so they require either an external power supply (as could easily be obtained from the neighboring grid using an umbilical run either through the water or beneath an associated seafloor) or else "soft started" by means of a reduced voltage starter in order to produce an initial rotation magnetic flux. Reduced voltage starters can lend important advantages to the system, such as quickly determining appropriate operational frequencies, and permitting an unpowered restart in the event the attendant power grip is deactivated for some reason, for example, as a result of damage caused by a hurricane.

Another important consideration for large waterborne power generating systems is the establishment of a well-balanced flotational equilibrium that allows for continuous dynamic position regardless of surrounding current velocities. Even assuming that surrounding current velocities remain within a predetermined range of acceptable operating velocities, system equilibrium could still be jeopardized by an especially powerful hurricane of the like, but disposition of the system well under the line of typical wave force, i.e., approximately 100-150 feet deep or so, will greatly reduce such disturbances. The various offsetting forces of gravitational kips, flotation kips, drag kips and holding kips will also contribute to the overall stability of a continuous water current energy generating system.

The flotation tube 102 illustrated in FIG. 1 comprises a cylindrical body portion disposed in mechanical communication with at least one end cap unit 104 that houses the aforementioned induction generators. The generators and associated end cap housings contain a drive shaft and, in some embodiments, related planetary gearing for propeller 105.

In some embodiments, flotation tube 102 comprises a cubical or hexagonal shape, though effective practice of the invention will admit to other geometries as well. In a presently preferred embodiment, flotation tube 102 is approximately cylindrical, and pressurized with gas (e.g., air or another safe, buoyant gas) so that, when the system is restrained by anchored tether 106, the combined forces will constitute the primary lifting force for the ocean current energy generating system.

Accordingly, the system can be raised to the surface for maintenance or inspection by turning off the generators, thereby reducing drag on the system, which allows the system to rise somewhat toward the surface. By opening the flotation tube(s) and/or evacuating fluid from the ballast tube(s), the unit can be safely and reliably floated to the surface so that maintenance or inspection can be performed.

According to a method of moving the system, tether 106 can also be released, so that the floating structure can be towed or otherwise powered toward land or another operating site.

The example embodiment depicted in FIG. 2 is a front view of the power generation system 201, equipped with a plurality of relatively large, slow moving propellers 206 disposed in mechanical communication with the shaft members of induction generator units 204 and 205. As seen in greater detail in FIG. 4A, the generator units are disposed within end cap units housed within flotation tubes 102, as well as across the span of a lattice type body portion of the system disposed between the flotation tubes.

Turning now to FIG. 3, a detailed view of the inside of the ballast tubes previously depicted as item 103 in FIG. 1 is provided, in which a plurality of labyrinth type isolation chambers are joined in such a manner that separation and mixture of various gases and liquids can be used to permit much finer control of the balance and flotational forces present in the system that can be obtained by means of floatation tubes 102.

As seen in the illustrated embodiment, an interior ballast system 301 formed within a ballast tube comprises an air control source 302 disposed in fluid communication with an overpressure check valve and a first isolation chamber 303. First isolation chamber 303 contains both a dry gas (e.g., air having a pressure equal to the surrounding outside water pressure) present in an upper portion of the chamber, and a fluid (e.g., seawater drawn in from outside the isolation chamber) present in a lower portion of the chamber.

First isolation chamber 303 also comprises a secondary air feed line 305 for distributing air to other gas-filled compartments of the structure, as well as lines for mixtures of gas and fluid from first isolation chamber 303 to second isolation chamber 304. Second isolation chamber 304 in turn comprises an upper portion containing air and a lower portion containing water or the like, which are separated by an isolation cylinder. In other embodiments, the isolation cylinder contains sea water upon which floats a barrier fluid in order to ensure better isolation between the air and seawater.

In further embodiments, either of first or second isolation chambers 303, 304 is equipped with instrumentation (e.g., pressure sensors or differential pressure sensors) to determine whether fluid or air is present in a particular cavity of the system. In still further embodiments, such sensors are input into a logical control system (not shown) used to assist in the detection and control of balance and thrust related measurements.

The process of advancing air through the system in upper portions of tanks while ensuring that water or other liquids remain in the lower portions is continued until desired balance and control characteristics are obtained. Ultimately, a final isolation chamber 306 is provided, which, in the depicted embodiment, comprises an air outlet valve 309 used to let air out of the system and, in some circumstances, water into the system.

A pressure safety valve 307 is provided in the event internal pressures become so great that venting of pressure is required in order to maintain the integrity of system control, and an open water flow valve 308 fitted with a screen to prevent accidental entry by sea creatures is disposed in a lower portion of the isolation tank 306.

Again, barrier fluids and the like can be used to reduce interaction between air and water, and if the system is fitted with a float control floating on top of the sea water, the barrier fluid can be retained after all of the sea water is expelled.

Figure 4B:
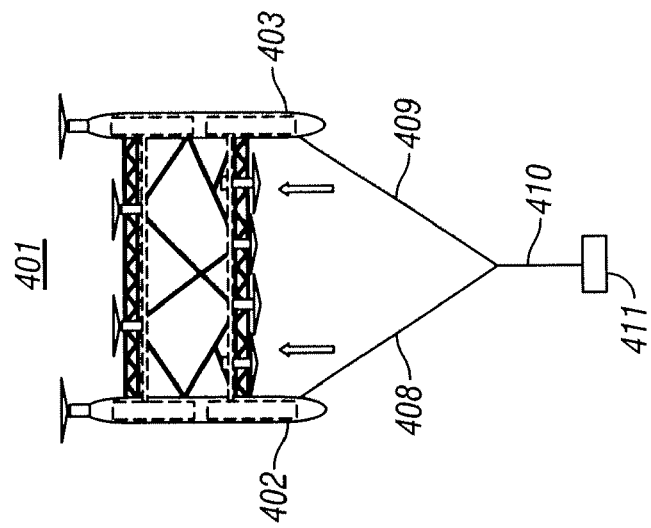
FIG. 4B is a top view of the example embodiment depicted in FIG. 4A, further including an associated tether anchoring system.
Figure 4A:
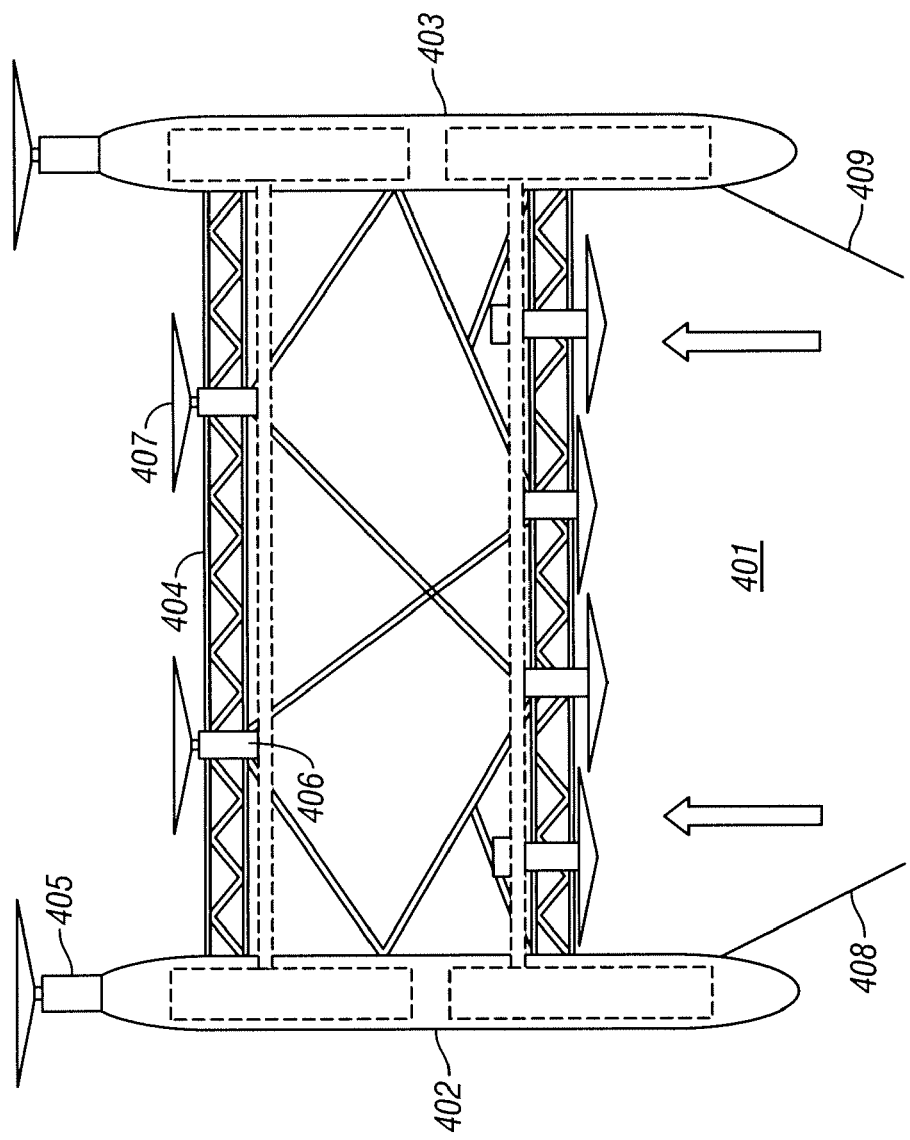
FIG. 4A is a top view of a water current power energy generation system according to a fourth example embodiment of the invention.

FIG. 4A presents a top view of one embodiment of the system 401, which in this instance comprises a first flotation tube 402 and a second flotation tube 403; a connecting, lattice like body portion 404 disposed therebetween; a plurality of induction generators 405, 406 positioned strategically around the floatation tubes and the body portions; a plurality of propellers 407 disposed in mechanical communication with the generators; and a plurality of tethering members 408, 409 disposed in mechanical communication with the flotation tubes 402, 403.

In the example embodiment depicted in FIG. 4B, tethering members 408 and 409 are joined to form a single anchoring tether 410 that is affixed in a known manner to anchoring member 411.

In various embodiments, anchoring tether 410 further comprises means for variably restraining and releasing the system. In various other embodiments, anchoring tether 410 terminates at an anchoring member 411 equipped with a tether termination device (not shown). Anchoring member 411 comprises any type of known anchor (e.g., a dead-weight anchor or the like) suitable for maintaining a fixed position in fast moving currents, which are usually found in locations with rocky seafloors due to soil erosion caused by the fast moving currents.

In still other embodiments, this portion of the station can be secured by attaching anchoring tether 410 to either a surface vessel or another ocean current energy generating device, or to another central mooring location such as a floating dynamic positioning buoy.

Figure 5:
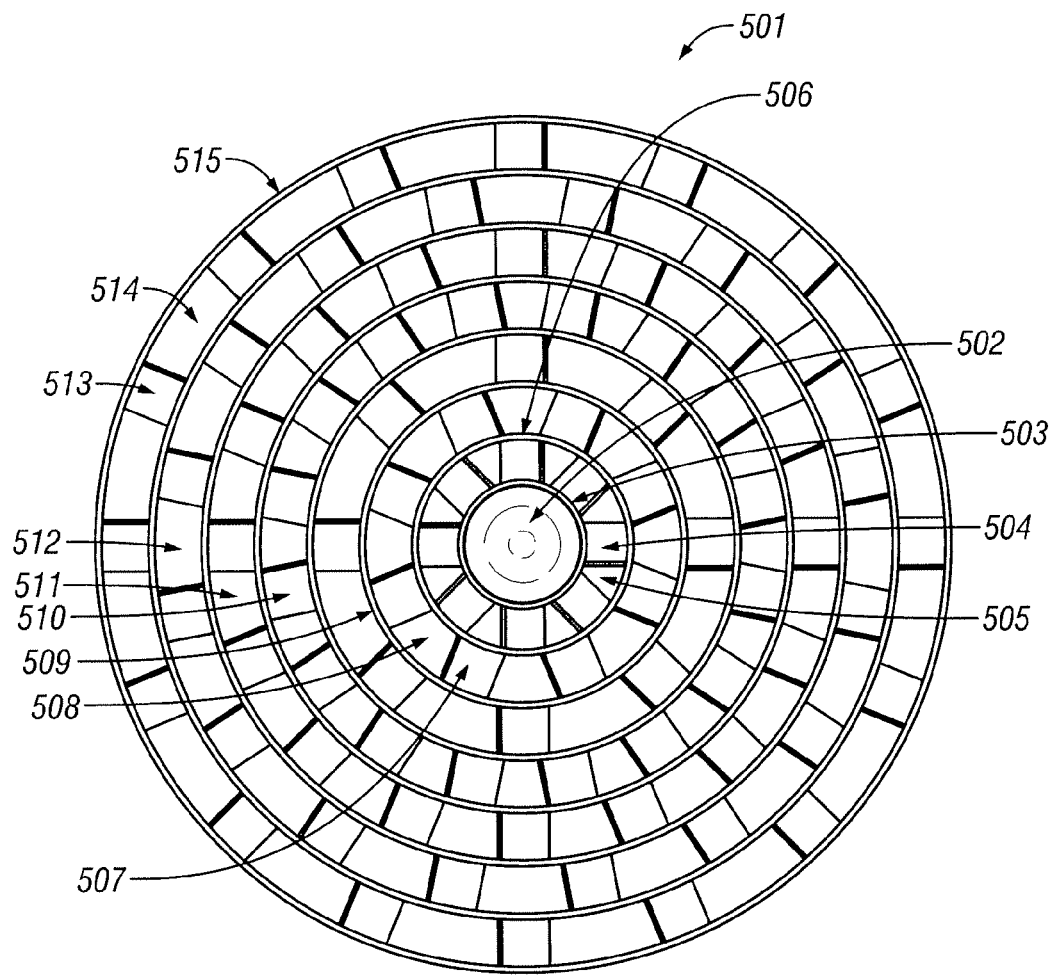
FIG. 5 is a front view of an example propeller system embodiment suitable for use in connection with a submerged or waterborne power generation system.
Figure 6:
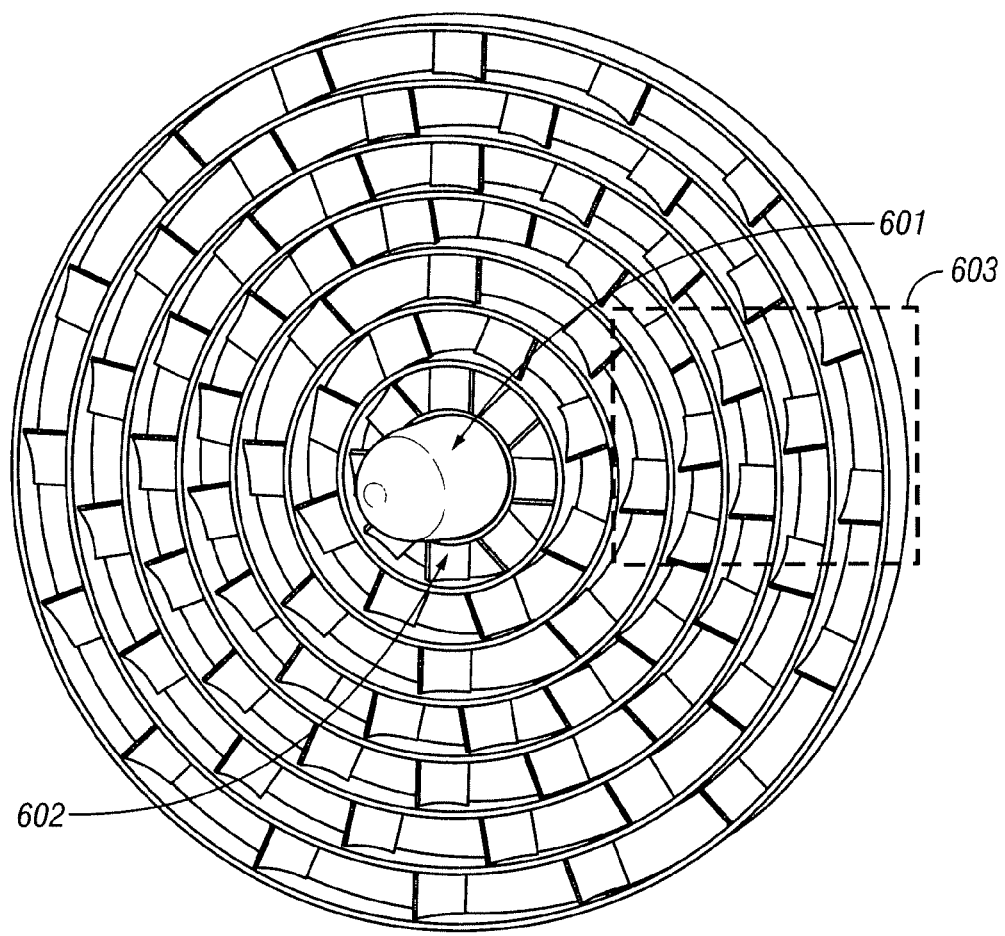
FIG. 6 is a perspective view of the example propeller system embodiment depicted in FIG. 5, with a detailed portion of the system isolated for additional perspective.
Figure 7:
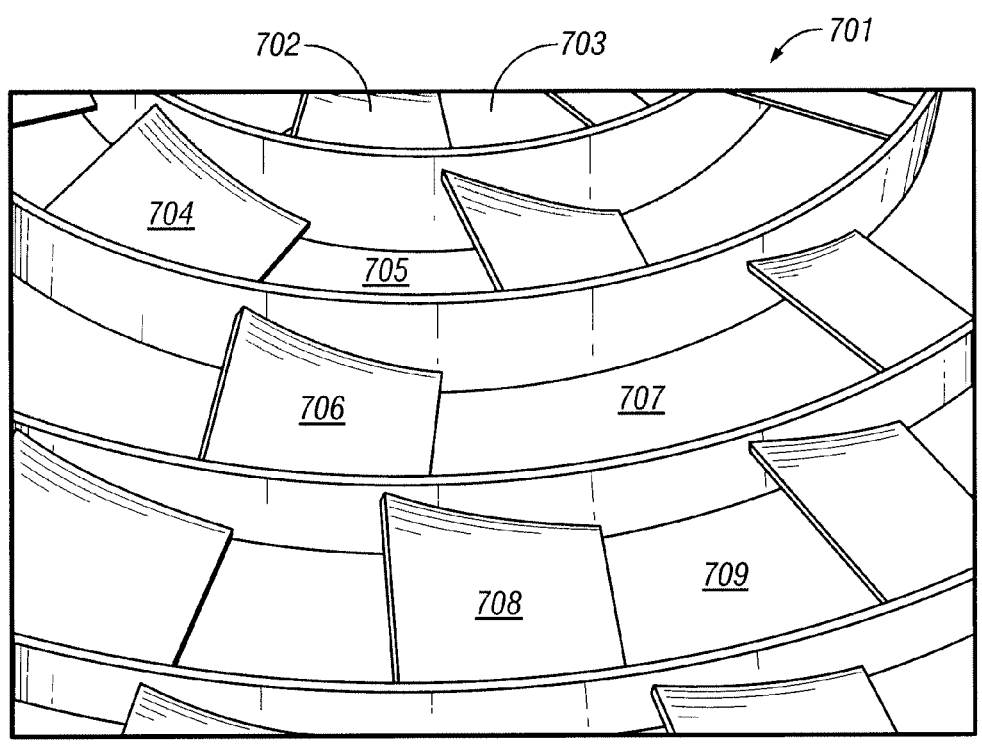
FIG. 7 is an isolated view of a portion of the example propeller system embodiment depicted in FIGS. 5 and 6.

Turning now to example propeller system embodiments discussed only very generally above, FIGS. 5-7 depict several specific (though non-limiting) example embodiments of a propeller system suitable for use with the water current power generation system disclosed herein. Those of ordinary skill in the pertinent arts will also appreciate, however, that while the example propeller systems disclosed herein are described with reference to a water current power generation system driven by an induction-type power generator, the example propeller systems can also be used in connection with other types of submerged or waterborne power generation systems to achieve many of the same advantages taught herein.

FIG. 5, for example, is a front view of an example propeller system embodiment suitable for use in connection with a submerged or waterborne power generation system.

As depicted, propeller 501 comprises a plurality of alternating fin sets and enclosing rings, which will hereinafter be referred to as a "fin-ring" configuration. Such fin-ring propellers would typically be designed to specification for each particular application, and improved efficiency will be realized by tailoring the diameter, circumference, fin curvature and disposition eccentricity, material selections, etc., based on the operational frequencies required by the induction generators, the speed of surrounding water currents, environmental considerations (e.g., whether the propellers should have openings or voids through which fish or other aquatic life may pass), and so on. Similarly, neighboring sets of propellers can be rotated in opposite directions (e.g., either clockwise or counterclockwise, as representatively depicted in FIG. 2) in order to promote the creation of eddies or dead zones in front of the propellers, which can repel or help protect marine life, enhance propeller rotation efficiency, etc.

When used in connection with a water current power generation system driven by an induction-type power generator, the only firm operational requirement for the propellers is that they are capable of rotating associated generator shafts at the speeds required to obtain operational generator frequencies. However, it is highly desirable that the system as a whole remains passive with respect to interaction with local marine life, and optimal performance results are achieved when the system generates the required power output while still maintaining an environmentally neutral operating environment.

Beginning in the center of the device, it is seen that propeller 501 is disposed around a hub or shaft portion 502 that both holds the propeller 501 in a secure and reliable manner (e.g., by means of mechanical affixation, such as by means of encapsulated rust-resistant fasteners, welding a propeller body or multiple pieces of a propeller body to a shaft into a single unitary whole, etc.) and imparts a rotational torque proportional to the angular momentum of the rotating propeller onto the shaft for delivery to the power generator. In some embodiments, hub or shaft portion 502 further comprises a flotation means used to improve the mechanical connection of the Fin-Ring propeller to the shaft. Like the affixation means, drive shafts appropriate for this task currently exist in the art of record, and may comprise, for example, a series of gears and/or clutches, breaking systems, etc., as would be required to effectively communicate the propeller's rotational torque to the generator shaft.

In one specific embodiment, a retaining fastener such as a bolt and washer assembly or the like is removed from the end of a drive shaft, the fin-ring propeller structure is slipped over the exposed shaft, and then the fastener is replaced, thereby mechanically affixing the fin-ring structure to the shaft. Optimally, the fastener would then be covered by a water-tight cover or the like as representatively depicted in FIG. 6, item 601.

In other embodiments, a central hub comprises the connection point mechanical communication with a large shaft, which can be either installed or removed and replaced as a single structure so that the propeller can be easily serviced and maintained while in the water. In other embodiments, the hub further comprises a fixed flotation means in order to resist the overhanging load of the shaft and propeller assembly. Similarly, the propellers (especially the front propellers in a submerged system, which absorb most of the force of the water current) can be drag mounted to overcome resistance attributable to cumulative fluid pressure against the fin-ring structure.

Regardless of how the propeller is affixed to the shaft and whether it is drag mounted and/or supported by a fixed flotation member, the exemplary embodiment of the fin-ring design depicted herein is generally similar across a multitude of other, related embodiments suitable for practice within the system. For example, in the example embodiment 501 depicted in FIG. 5, the hub attachment assembly 502 is concentrically surrounded by a first ring member 503, beyond which (i.e., further out from the hub assembly) is a second ring member 506. Disposed between first ring member 503 and second ring member 506 is a plurality of fin members 504, each of which is separated by a gap 505. The gap space between fin members 504 will vary by application, but as a general matter the gaps between fins will increase in size from the inner most ring (in which the gaps are typically the smallest) to the outermost rings (where the gap space is the largest). Other configurations admit to gaps of similar sizes, or even larger gaps on inner rings than on outer rings, but an advantage of a mostly solid inner ring surface, wherein most of the entirety of the ring's possible surface area is utilized by fins rather than gaps, is that the structure will tend to force fluid pressure away from the center of the structure toward the outermost rings and beyond the perimeter of the device altogether.

This approach helps the propeller rotate more easily, and greatly improves the environmental safety of the device by forcing small marine life and the like that might come near the structure toward the outside of the system so that they can either avoid the propeller structure altogether, or else pass through one of the larger gaps in the outer rings. Since resistance against the structure is reduced and greater rotational torque is transmitted to the drive shafts with less drag and loss, the propeller can also be rotated very slowly (for example, in one example embodiment generating satisfactory field results, the propeller rotates at a speed of only 8 RPM), further ensuring that marine life will be able to avoid the structure and enhancing environmental neutrality and safety. The slow rotational speeds also make the system more rugged and durable and less likely to suffer damage if contacted by debris or a submerged object floating nearby.

Successive concentric rings of fins 507 and gaps 508 disposed within additional approximately circular rings 509 are then added to the structure, thereby creating additional concentric rings of fins and gaps 510-512 until the desired circumference has been achieved. In a presently preferred embodiment, the gap spaces 514 of the outermost ring are the largest gap spaces in the system, and separate fins 513 to the system's greatest extent. A final ring member 515 encloses the outer periphery of the propeller system, again enhancing it's environmental friendliness, as fish and other marine life inadvertently striking the outside ring 515 will encounter only a slight glancing blow against a slowly-moving structure, which further increases marine safety by pushing water and fluid pressures away from the device as much as possible.

As seen in the boxed region 603 of FIG. 6 (which generally depicts the example embodiment of FIG. 5, though with the hub attachment portion covered with a water-proof cap 601 or the like), the pitch of fins 602 measured relative to the plane of the fin-ring assembly can be altered (for example, the rings can be disposed with greater eccentricity) as their position within the assembly is advanced from the first ring surrounding the central hub toward the outermost rings. Disposing fins 602 at a flatter pitch within the interior rings and more eccentrically (i.e., in a plane more perpendicular to the assembly plane) in the outer rings will tend to flatten and smooth the water flow around the propeller, thereby achieving superior fluid flow characteristics (which minimizes system vibration), creating less resistance against the propeller structure, and providing a greater surrounding centrifugal fluid force to assure that marine life avoids the center of the propeller system.

In the example embodiment 701 depicted in FIG. 7 (which is representative of the boxed region 603 in FIG. 6), a series of curved fins 702, 704, 706, 708 are disposed between gaps 703, 705, 707, 709 of increasing size (note that the center attachment hub from which the smallest concentric rings originate would be located beyond the top of the Figure, e.g., above fin 702 and gap 703). In the depicted embodiment, fins 702, 704, 706, 708 are also disposed with greater eccentricity as they are installed further and further from the hub, so that the disposition angle of fin 708 measured relative to the assembly plane would be greater than that of fins 702, 704, 706 disposed neared the center attachment hub.

Figure 8:
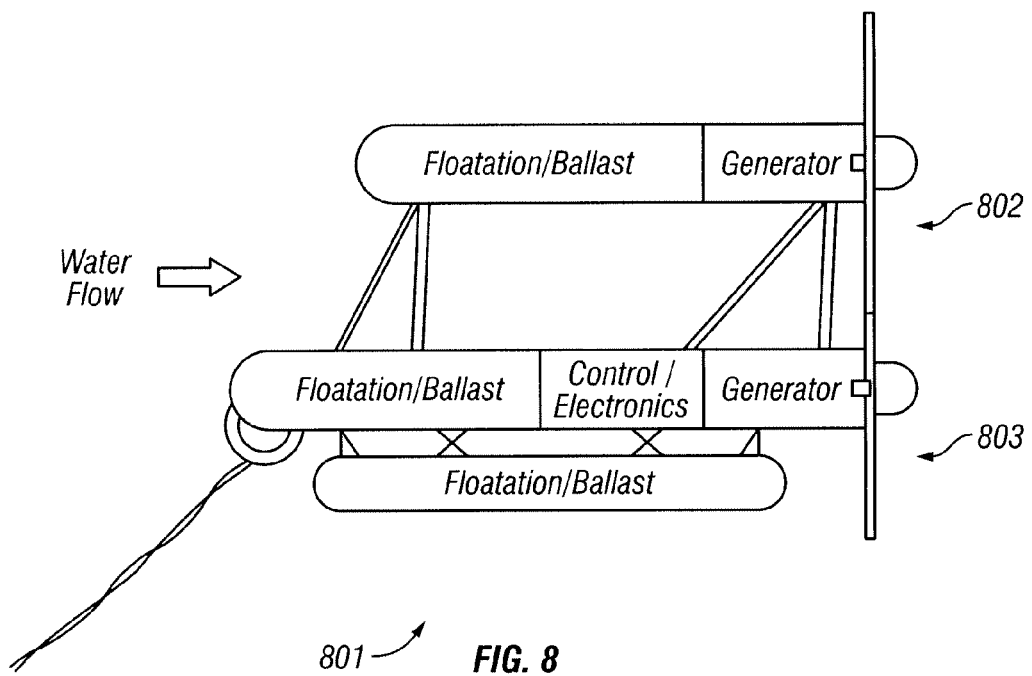
FIG. 8 is a side view of an example water current power generation system further comprising a drag mounted propeller array.

In the example embodiment depicted in FIG. 8, a tethered, submerged water current power generation system is provided in which the entire propeller array is drag mounted, so that power interference from a front mounted array is avoided, and greater system stability and power efficiency is achieved. As seen, this particular configuration admits to one or more propellers disposed in both an upper drag mount position and a lower drag mount position, though disposition of multiple propeller arrays in an either greater or fewer number of levels is also possible.

Figure 9:
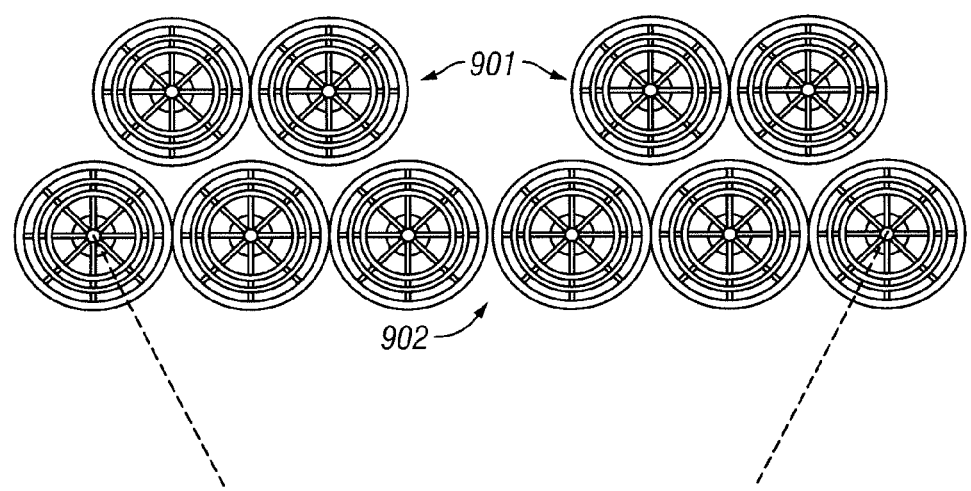
FIG. 9 is a rear view of the example water current power generation system depicted in FIG. 8, wherein an even number of propellers facilitate offsetting rotational forces in a drag mounted array.

In FIG. 9, which is essentially a rear view of the alternative embodiment depicted in FIG. 8, it is seen that one specific (though non-limiting) embodiment comprises a propeller array having ten total propellers, with six propellers being disposed in a lower drag mount position, and four propellers being disposed in an upper drag mounted position, with the upper position array being further distributed with two propellers on each side of the power generation system. This particular embodiment has been found to admit to superior power generation characteristics, while stabilizing the attendant system structure by minimizing vibration, and allowing evenly matched pairs of propellers to run in opposite rotational directions. While such configurations are optimal for certain embodiments of the power generation system, a virtually limitless number of other arrays and disposition configurations can instead be employed when deemed effective in a given operations environment.

As a practical matter, the composition of the entire fin-ring propeller structure would likely be common, for example, all made from a durable, coated or rust-resistant, lightweight metal. However, differing material compositions as between fins and rings is also possible, and other materials such as metallic composites, hard carbon composites, ceramics, etc., is certainly possible without departing from the scope of the invention.

While still other aspects of the invention, which in current practice typically comprise devices associated with underwater energy production generally (for example, auxiliary power supply sources, fiber optic control and communication systems, attendant remote-operated vehicles used to service the power station, etc.), are certainly contemplated as peripherals for use in the deployment, positioning, control and operation of the system, it is not deemed necessary to describe such items in great detail as such systems and sub-systems would already be known to those of ordinary skill in the pertinent arts.

Though the present invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. A system for deriving power from submerged or waterborne structures, said system comprising:
    a submerged flotation chamber, wherein said submerged flotation chamber further comprises a ballast chamber including one or more labyrinth type isolation chambers, and wherein one or more of said labyrinth type isolation chambers further comprises a buoyant fluid disposed therein, a buoyant fluid intake valve, a buoyant fluid exit valve, and a buoyant fluid source control means; and
    a submerged induction type power generation unit disposed in communication with said flotation chamber; and a propeller unit disposed in communication with said induction type generator unit,
    wherein said propeller unit further comprises a hub member for disposing said propeller unit in communication with a drive system, and a propeller member having one or more concentrically disposed rings, said concentrically disposed rings having an inner ring member, an outer ring member, and a plurality of curved fin members separated by gap spaces disposed between said inner ring member and said outer ring member.

2. The system of claim 1, wherein said propeller unit further comprises a drive shaft.

3. The system of claim 1, wherein said propeller unit further comprises a gearing assembly.

4. The system of claim 1, wherein said propeller unit further comprises a braking assembly.

5. The system of claim 1, wherein said propeller unit further comprises a clutch assembly.

6. The system of claim 1, wherein said propeller unit further comprises a fixed flotation member.

7. The system of claim 1, wherein said propeller unit is drag mounted to said system.

8. The system of claim 1, wherein a plurality of concentric rings, each equipped with a plurality of fins separated by gap spaces, is enclosed at the outermost periphery of the propeller member by an outermost enclosing ring.

9. The system of claim 8, wherein fins disposed within larger concentric rings near the structure's periphery are disposed at more eccentric angles measured relative to the assembly plane than fins disposed within smaller concentric rings near the structure's hub member.

10. The system of claim 1, wherein gap spaces formed between fins disposed within larger concentric rings near the structure's periphery are larger than gap spaces formed between fins disposed within smaller concentric rings near the structure's hub member.

11. The system of claim 1, wherein fins disposed within larger concentric rings near the structure's periphery are disposed at less eccentric angles measured relative to the assembly plane than fins disposed within smaller concentric rings near the structure's hub member.

12. The system of claim 1, wherein gap spaces formed between fins disposed within an outermost concentric ring located near the circumferential periphery of the propeller are larger than gap spaces formed between fins disposed within an innermost concentric ring located near the hub member.

* * * * *